United States Patent [19]

Schwaemmle et al.

[11] Patent Number: 5,070,996

[45] Date of Patent: Dec. 10, 1991

[54] CHAIN CONVEYOR AND PALLET

[76] Inventors: Kurt Schwaemmle, 4958 Whispering Pine La., Bloomfield Hills, Mich. 48013; Ronald K. E. Fein, 44596 Penney Ct., Canton, Mich. 48187

[21] Appl. No.: 524,630

[22] Filed: May 17, 1990

Related U.S. Application Data

[63] Continuation-in-part of Ser. No. 408,132, Sep. 14, 1989.

[51] Int. Cl.⁵ .............................................. B65G 37/00
[52] U.S. Cl. ................................ 198/465.3; 198/346.1; 198/414
[58] Field of Search ............... 198/465.3, 803.2, 346.1, 198/414, 779

[56] References Cited

U.S. PATENT DOCUMENTS

| | | | |
|---|---|---|---|
| 2,959,273 | 11/1960 | Sykes | 198/779 |
| 3,653,489 | 4/1972 | Tullis et al. | 198/779 |
| 4,062,444 | 12/1977 | Nakov et al. | |
| 4,681,212 | 7/1987 | Miller | |
| 4,850,472 | 7/1989 | Liebel et al. | |
| 4,938,334 | 7/1990 | McGinn | 198/414 |

FOREIGN PATENT DOCUMENTS

| | | |
|---|---|---|
| 2712214 | 9/1978 | Fed. Rep. of Germany ... 198/465.3 |
| 3539303 | 5/1987 | Fed. Rep. of Germany . |
| 1407765 | 7/1988 | U.S.S.R. . |

*Primary Examiner*—Joseph E. Valenza
*Attorney, Agent, or Firm*—Dykema Gossett

[57] ABSTRACT

An improved chain conveyor and pallet structure are disclosed in which the pallet contacts the middle link of the three-link chains typically employed in chain conveyors, and is supported upon the outer and inner links of the chain. The distance between the pallet contact members and the support surfaces is increased such that the pallet may be removed from the chain conveyor for repair or placement on a second conveyor. In another feature of the present invention, the pallet is supported on the center link on both its upper and lower run, allowing the use of heavier sturdier pallets. At least some of the rollers in the middle links are preferably of a greater diameter than the rollers on the inner or outer links reducing the stress between the link and the pallet, and increasing the lift of both members. The present invention also discloses a speed bar placed below the three link chain to engage and rotate the center link increasing the speed that the pallet is moved at, and providing for a localized increased speed for the pallet.

13 Claims, 4 Drawing Sheets

_Fig-7_

_Fig-8_

_Fig-9_

CHAIN CONVEYOR AND PALLET

BACKGROUND OF THE INVENTION

This application is a continuation-in-part of serial number 07/408,132, filed Sep. 14, 1989, the disclosure of which is incorporated herein by reference. The invention disclosed in this application relates to an improved conveyor and pallet structure in which the pallet supports greater weight, may be easily removed from the conveyor, and is more versatile then prior art pallets.

A known type of conveyor employs chains to frictionally engage and move a part-carrying pallet through a conveyor distance. Such conveyors typically include two shafts rotating about parallel axes that are spaced from each other by a conveyor distance over which pallets are to be conveyed. In a common type of chain conveyor, each of these shafts have two separate sprocket gears spaced axially along the shaft. Endless three-link chains are mounted upon one sprocket set on each of the shafts and extend along the conveyor through the conveyor distance. The endless chains are thus also spaced by an axial distance roughly corresponding to the distance between the sprocket sets. Pallets are mounted in contact with the endless chains and are driven along the conveyor distance by frictional contact with the endless chains. The pallets typically travel along the upper extent of the chain, commonly known as an upper run, reach the end of the conveyor distance, are pivoted beneath the sprocket sets, and travel on the endless chain below the sprockets, commonly known as the lower run.

In many prior art chain conveyors the chains are supported upon the chain links closest to the axial ends of the conveyor, and the axially innermost third chain link supports the pallet. Since the prior art chains bear the weight of the pallet from the innermost link, and the chains are cantilever supported at an outer link, a moment arm is created about the outermost link of the chain that may result in the chain binding or bending if an overly great weight is placed upon the pallet.

Another prior art problem is that the chains were often covered at vertically upper positions by supports to be fully supported, which prevented access to the chains. Also, any debris or chips could become lodged between the supports and the chain.

The prior art pallet has frictional contact members that contact the chain during the upper and lower runs, and there is insufficient clearance between the contact members and the chain to allow the pallet to be easily removed from the chain conveyor. In many prior art chain conveyors the pallet must be disassembled in order to be removed from the endless chains.

U.S. Pat. No. 4,062,444 describes a three-link chain conveyor in which the pallet is supported on the middle link when on the upper run. However, the pallet is supported on the innermost link when on the lower run. Since the pallet was supported on the innermost link on the lower run, the weight of the pallet is limited to prevent the above-described binding and bending. With this patented conveyor, it was not possible to use heavier sturdier pallets.

Conveyors typically move a pallet at a single speed throughout the conveyor distance. It is known in the prior art to place members at portions of the conveyor path to increase pallet speed over a certain portion of the conveyor distance. These members are used, for example, once parts are removed from the pallet, to increase the pallet speed and quickly remove the pallet from the unloading area. However, this type of speed-up arrangement has never been used with a pallet having both an upper run and a lower run. Prior art speed-up members typically lift the pallet above its normal position on the chain conveyor. Since many prior art pallets which were utilized on both upper and lower runs had no clearance, it has not been possible to use this type of speed-up member.

SUMMARY OF THE INVENTION

The present invention solves the problems of the prior art by supporting a pallet at a point on a means for moving the pallet, and supporting the means for moving the pallet on both axial sides of the point. In one embodiment an improved chain conveyor and pallet structure is disclosed in which the pallet is supported at a position on a three-link chain intermediate two support positions through which the three-link chain is supported on a frame of the chain conveyor. In addition, clearance is provided between the frictional contact members of the pallet and a support surface for the three-link chains, such that the pallet may be removed from the chain conveyor without disassembly of the pallet. The pallet can be removed from a first conveyor after completion of a first conveyor upper run and placed on a second conveyor extending in a different direction, or may be rotated 180° on a single conveyor to change the position of a part on the pallet.

The chain conveyor as disclosed by an embodiment of the present invention comprises a first shaft rotating about a first axis and having at least two sprocket sets spaced axially along the first axis. A second shaft rotates about a second axis, parallel to the first axis, and spaced from the first axis by a conveyor distance over which parts are to be conveyed. The second shaft also has at least two sprocket sets spaced axially along the second axis. Frame members mount and define axial ends of the first and second shafts.

A pair of endless three-link chains are received over the sprocket sets, such that they each extend over one sprocket set on the first axis, extend on an upper run along the conveyor distance, extend over and under one sprocket sets on the second axis, and extend back along a lower run beneath the sprocket set to the sprocket set on the first axis. Each of the endless chains have three links, with the links being spaced inwardly from each of the axial ends towards the other of the axial ends. A first link is defined as the link closest to the axial end, a second, or middle link is defined as the next innermost link and a third link is defined as the axially innermost link.

A pallet is mounted for movement on the endless chains with the pallet having a generally planer support surface and a pair of downwardly extending guide bars. Each of the guide bars may have an upper run contact member in contact with the second link of one of the endless chains. The upper run contact member on the two guide bars are spaced from each other by a distance equal to the distance between the second links of the pair of endless chains. This arrangement will support approximately four times as much weight on the pallet then many prior art conveyors.

In a preferred embodiment of the present invention, each of the guide bars have a lower run contact member also in contact with the second link when the pallet is on a lower run. This allows the use of a heavier pallet, since the weight is fully supported on the lower run.

Preferably, the lower run contact member is in contact with the second link over less than the full axial length of the link. A sprocket which preferably engages the second link is also sized such that it is in contact with less than the entire axial extent of the second link. The lower run contact member is in contact with the innermost portion of the second link and the sprocket contacts the outermost portion of the second link.

Upper and lower run frames may support the pair of endless three-link chains along both the upper and lower runs, and have support surfaces below each of the first and third links. The guide bar has an axially outermost extent between the upper and lower guide members that provides a first clearance between the guide bar, the three-link chain and the upper run frames. The lower run contact member of the guide bar is spaced downwardly from the upper run frame by a second clearance. The combined clearances allow the pallet to be lifted, pivoted approximately 90°, and removed from the chain conveyor.

The clearance distances allow the removal of pallets by robotic manipulators, or an automatic station, such that a single pallet could be used to convey parts along a first chain conveyor, removed by the manipulator, turned and placed on a second conveyor extending in a second direction. The second conveyor could extend directly opposite to the first conveyor distance, and at the end of the second conveyor, a second manipulator could remove the pallet from the second conveyor and replace it on the first conveyor. This would reduce the number of required pallets. Also, the pallet can be lifted, turned 180° and replaced on the conveyor by an automatic station. This allows reorientation of the parts on the pallet as they proceed along the conveyor. The pallets are also easily removable for replacement or repair.

In the most preferred embodiment of the present invention, the roller of the center link is of a greater diameter than the inner or outer-most links. This reduces the stress between the link and the pallet and increases the life of both members.

Another feature of the present invention is the use of a speed bar placed below a link of the chain. The speed bar lifts the chain off a normal support and frictionally engages the roller of one link, causing it to rotate in addition to being driven by the sprocket. This rotation is transmitted to the pallet, which frictionally engages the roller, and increases the pallet speed, allowing a localized increased speed for a pallet having both upper and lower run contact members.

In a most preferred embodiment of the present invention, the upper and lower run contact member extend for a greater distance or length along the conveyor distance than the pallet support surface. This provides more secure contact between the pallet and the endless chains as they move along the conveyor distance. In addition, the upper run contact portion may be longer than the lower run contact portion, providing proper guidance as the pallet turns about the sprocket sets at the end of the conveyor distance.

These and other objects and features of the present invention can be best understood from the following specification and drawings, of which the following is a brief description.

DETAILED DESCRIPTION OF A PREFERRED EMBODIMENT

Figure 1:
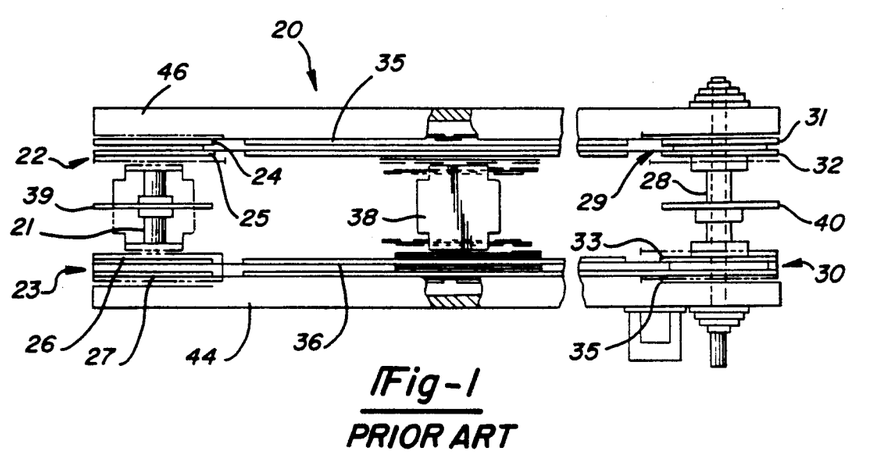
FIG. 1 is a top view of a known chain conveyor.
Figure 2:
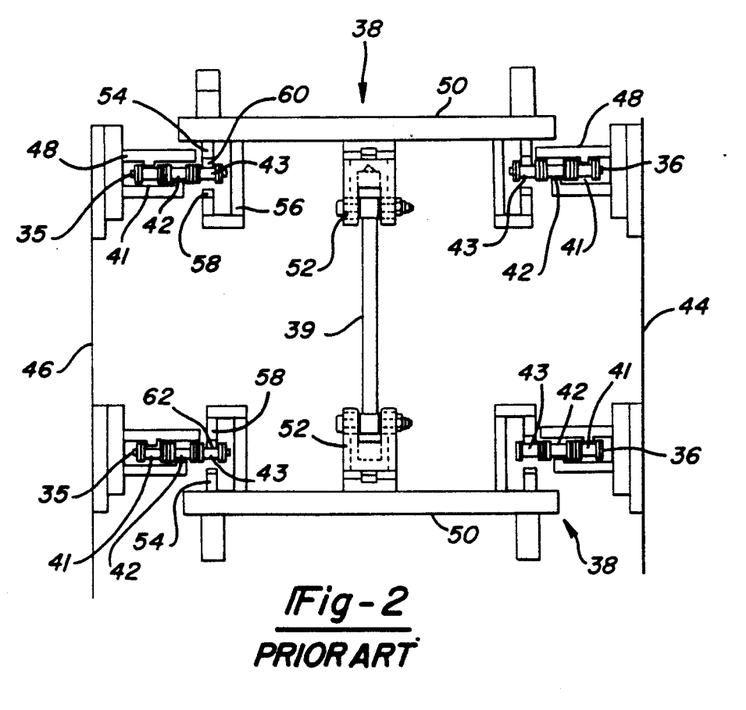
FIG. 2 is a cross-sectional view through the known chain conveyor illustrated FIG. 1, showing separate pallets mounted on both the upper and lower runs.

A type of prior art chain conveyor structure can be best understood from FIGS. 1 and 2. As shown in FIG. 1, chain conveyor 20 consists of a first shaft 21 rotating about a first axis and having a pair of axially-spaced sprocket sets 22 and 23. Sprocket set 22 has a pair of sprocket gears 24 and 25 spaced by a small axial distance and sprocket set 23 has a pair of sprocket gears 26 and 27, also spaced by a small axial distance. A second shaft 28 rotates about a second axis and has sprockets sets 29 and 30 spaced by an axial distance. Sprocket set 29 has a pair of sprocket gears 31 and 32 spaced by a small axial distance and sprocket set 30 has a pair of sprocket gears 33 and 34 also spaced by a small axial distance. An endless three-link chain 35 is mounted upon sprocket sets 22 and 29 and extends between the first and second axes. A second endless three-link chain 36 is mounted upon sprocket set 23 and 30 and extends over the distance between the two sprocket sets. The chains rotate on the sprocket sets and extend above the sprockets over the distance between the sprockets, also known as an upper run, to carry parts on pallet 38. At the end of the upper run, pallet 38 rotates over the sprocket sets, and then travels beneath the sprocket sets along with endless three-link chains 35 and 36. Pallet 38, along with chains 35 and 36 then travels below the sprocket sets along a lower run, and returns to the first sprocket sets at the opposite end of the lower run. The distance between shafts 21 and 28 is defined as a conveyor distance. Center sprocket 39 is mounted on first shaft 21 and center sprocket 40 is mounted on second shaft 28 in order to assist in guiding pallet 38 as it moves from the upper run to the lower run.

As shown in FIG. 2, each endless three-link chain 35 and 36 has first link 41, which is nearest to the axial end of the endless three-link chains 35 and 36, second, or middle link, 42 is the next innermost link, and third link 43 is the axially innermost link. That is, third link 43 is the link closest to the opposite endless three-link chain 35 or 36. Frame members 44 and 46 are disposed upon each axial end of chain conveyor 20 and mount shafts 21 and 28 for rotation. First link 41 is the link closest to either frames 44 or 46, second link 42 is the next innermost link, and third link 43 is the link furthest removed from frame members 44 or 46, and closest to the opposed one of frame members 44 or 46. Gears 31, 32, 33 and 45 engage the second and third links of chains 35 and 36.

In the prior art, chain support 48 mounted chains 35 and 36 along both the upper and lower runs. In some prior art chain conveyors, chain support 48 provided support beneath second link 42 of endless three-link chain 35 or 36 and above first link 41 of endless three-link chain 35 or 36.

Pallet 38, as used with some prior art chain conveyors consisted of support surface 50 upon which parts to be conveyed were placed and which had a spring-loaded center sprocket engagement member 52 biased into engagement with center sprockets 39 or 40 when pallet 38 reached the end of either an upper or lower run.

Pallet 38 may have an upper run contact member 54 in contact with third-link 43 of endless three-link chains 35 and 36 at contact point 60. Thus, pallet 38 is supported on the axially innermost third link 43 of endless three-link chains 35 and 36 while on an upper run. Endless three-link chains 35 and 36 are often supported on their second link 42 and first link 41. Thus, the weight from pallet 38 is applied from third link 43 and supported at first and second link 41 and 42, and from there into chain support 48. This results in a moment arm about the cantilever support that may cause binding between chains 35 and 36 and support 48. This limits the maximum weight that may be conveyed along pallet 38, since support 48 can only support a limited amount of weight. Pallet 38 also has a downwardly extending lower run contact arm 56 that extended to contact member 58.

Lower run contact member 58 is in contact with third link 43 of endless three-link chains 35 and 36 at contact point 62 when pallet 38 extends along a lower run. The distance between upper run contact member 54, lower run contact arm 56, contact member 58, supports 48 and three-link chains 35 and 36 determines the clearance between endless three-link chains 35 and 36 and pallet 38. In many prior art chain conveyors, this clearance is not adequate to allow the pallet 38 to be removed from the chain conveyor without disassembly of at least one contact member 54 or 58.

Figure 3:
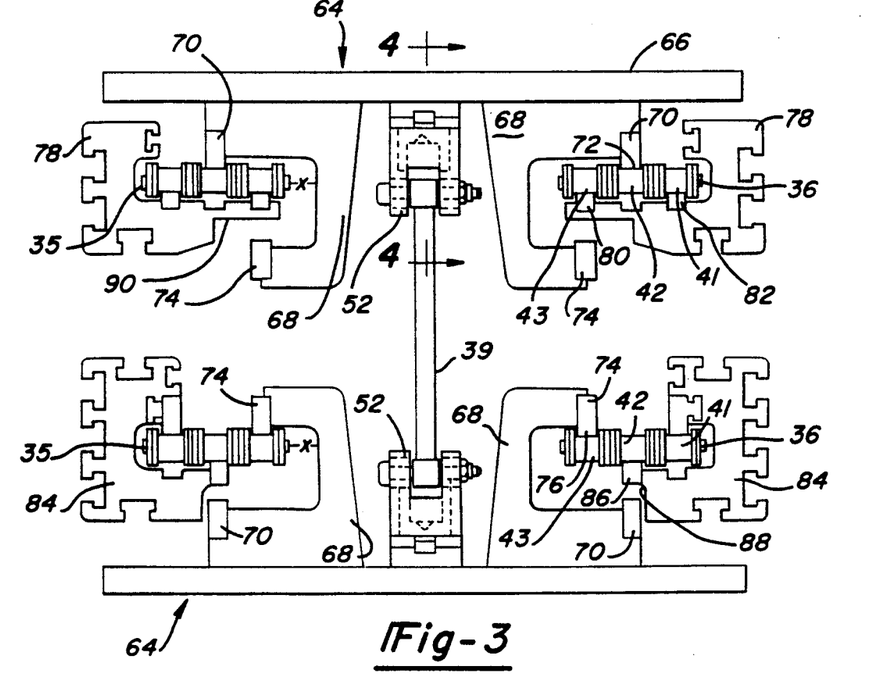
FIG. 3 is a cross-sectional view similar to FIG. 2, but showing an improved chain conveyor and pallet as disclosed by the present invention.

A first embodiment of a chain conveyor and pallet structure according to the present invention is illustrated in FIG. 3. Pallet 64 has planar support surface 66 and downwardly extending guide bars 68. Downwardly extending guide bars 68 may each have an upper run contact member 70 in contact with second link 42 of endless three-link chains 35 or 36 at contact point 72.

Lower run contact member 74 is disposed at a lowermost portion of downwardly extending guide bar 68 and contacts third link 43 at contact point 76. It may not be necessary for lower contact member 74 to be supported on second link 42 along a lower run since, pallet 64 is not bearing weight from parts when extending along the lower run.

Upper run frame 78 may include third link support 80 and first link support 82 that support endless three-link chain 36 at axially spaced positions on both sides of upper run contact member 70 and contact point 72. With this support, there is no resulting moment arm applied to endless three-link chain 36 and thus, binding or bending may be avoided. Lower run frame 84 may include second link support 86 which supports endless three-link chains 35 and 36, and supports the weight of pallet 64 when extending along a lower run.

A clearance distance x is illustrated between guide bar 68 and the axially innermost portion of chains 35 and 36, or upper run frame 78. Clearance 90 is formed in upper run frame 78 and provides space between lower run contact member 74 and upper run frame 78. Clearance 90, in combination with clearance x, is sufficient to allow lower run contact member 74 to pivot laterally past upper run frame 78. When pallet 64 is extending along an upper run, it may be lifted, pivoted approximately 90 degrees and removed from chain conveyor 20.

Clearance 88 is formed between lower run support 84 and upper run contact member 70 when pallet 64 is extending along a lower run. This clearance, in combination with clearance distance x, is also adequate to allow pallet 64 to be pivoted and removed from the chain conveyor 20.

Figure 4:
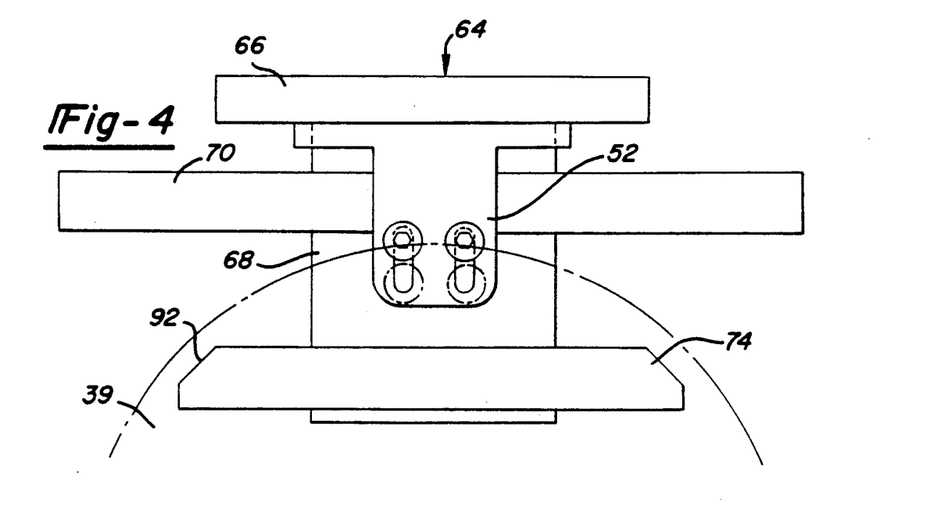
FIG. 4 is a cross-sectional view along lines 4—4 as shown in FIG. 3.

As shown in FIG. 4, pallet 64 has support surface 66 and downwardly extending guide bars 68 with upper run contact member 70 and lower run contact member 74. Upper run contact member 70 extends along the conveyor distance for a length greater than the length of support surface 66. Lower run contact member 74 also extends for a greater length than support surface 66, although lower run contact member 74 does no extend to as great a length as upper run contact member 70. Lower run contact member 74 has chamfered ends 92 that provide clearance between lower run contact member 74 and endless three-link chains 35 and 36 when pallet 64 is pivoting about the sprocket sets to move from an upper run to a lower run. The relative sizes of upper run contact member 70 and lower run contact member 74 insure that pallet 64 will be firmly guided on endless three-link chains 35 and 36 as pallet 64 moves from a upper run, around the sprocket sets and downwardly to begin its lower run. In addition, the fact that both upper run contact member 70 and lower run contact member 74 extend for a greater distance than support surface 66 serves to distribute the weight from pallet 64 to a greater surface area on endless three-link chains 35 and 36.

The length of lower run contact member is selected such that chamfered ends 92 are placed a distance from a center line of lower run contact member 74 such that they ensure proper alignment between pallet 64 and center sprocket 39 and 40. Chamfered ends 92 abut, and are received between, adjacent rollers of the three-link chains 35 and 36. Pallet 64 will stall while awaiting chamfered end 92 to align with a space between the rollers. By selecting the distance from chamfered end 92 to the center of lower run contact member 74, the proper alignment between center sprocket engagement member 52 and center sprockets 39 and 40 is assured. The spring-loaded center engagement member 52 extends downwardly to a position where it contacts center sprockets 39 or 40 when pallet 64 is moved from an upper run, around the sprockets sets, and downwardly onto a lower run.

Another important feature is that three-link chains 35 and 36 are uncovered along vertically upper portions. This allows easy access to the chains for repair and prevents debris from lodging and binding.

As disclosed above, the improved pallet 64 of the present invention may be removed from chain conveyor 20 by simply lifting and pivoting the pallet approximately 90 degrees in order to clear lower run contact member 74 from the axially innermost extents of chains 35 and 36, and upper run frame members 78. Pallet 64 may then simply be removed upwardly or outwardly. This removal could be performed by a robotic manipulator and allows a conveyor arrangement in which a first conveyor moves pallet 64 from a first position to a second position at which a manipulator removes pallet 64 from the first conveyor, turns pallet 64 and places it on a second conveyor that may move from the second position back to the first position. This eliminates the lower run. Thus, two conveyors can be supplied using only half the pallets that would otherwise be necessary.

Figure 5:
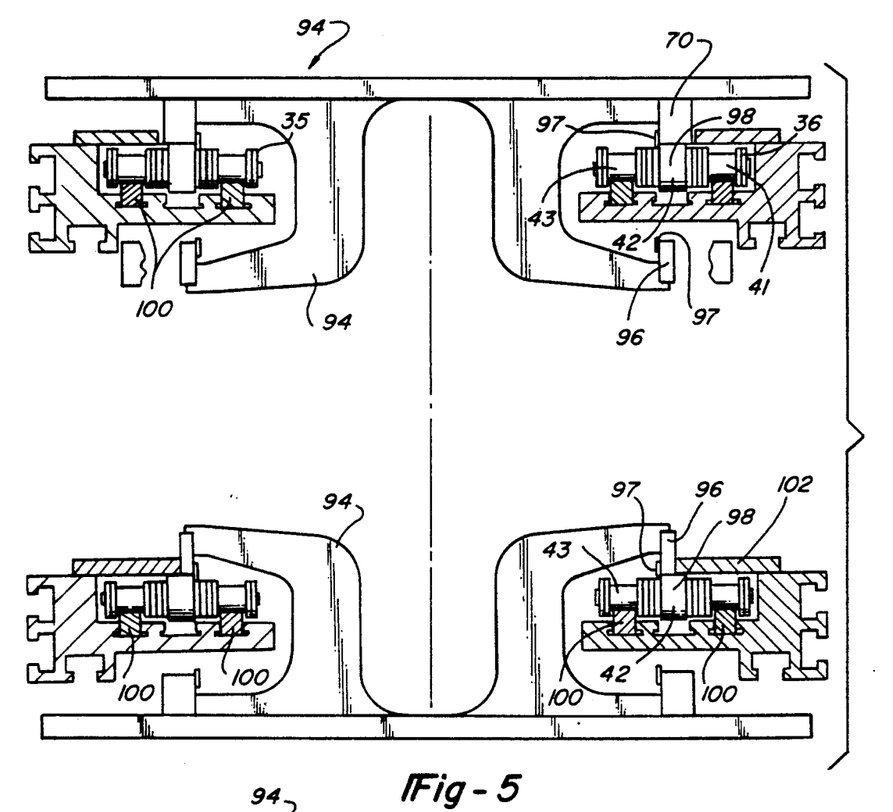
FIG. 5 is a cross-sectional view similar to FIG. 3, but showing another embodiment of the present invention.

Second embodiment 94 of a pallet according to the present invention is illustrated in FIG. 5 having upper run contact member 70 and lower run contact member 96. Both upper run contact member 70 and lower run contact member 96 have lip 97 extending downwardly, and retaining the pallet on roller 98 of second link 42. Roller 98 is illustrated being of a greater diameter than the sizes of first link 41 or third link 43. Thus, pallet 94 and roller 98 extend above the surface of the chain. For this reason, it is necessary to have lip 97 retaining upper run contact member 70 and lower run contact member 96 on roller 98. It is most preferred that every other roller on second link 42 be of the increased diameter.

The use of a enlarged diameter roller 98 at the contact point reduces the stresses between the roller and contact members 70 and 96. These stresses between the chain and the contact members are inversely proportional to the diameter of the roller, and thus the large diameter roller 98 reduces this stress.

Lower run contact member 96 is illustrated riding on second link 42. Supports 100 are spaced under both first and third links 41 and 43 on the lower run. Supporting pallet 94 on second link 42 on the lower run allows the use of a heavier, sturdier pallet. As shown, lower run contact member 96 extends for only a portion of the axial length of roller 98. This allows sprockets 25, 26, 32 and 33 to engage the second link 42, by engaging the outer portion of second link 42, while lower run contact member 96 rides on the inner portion of second link 98.

Supports 100 support three-link chains on both sides of second link 98, thus supporting the weight on the pallet on two support points, and eliminating any cantilever support. Top guide 102 retains the chain within the support member.

Figure 6:
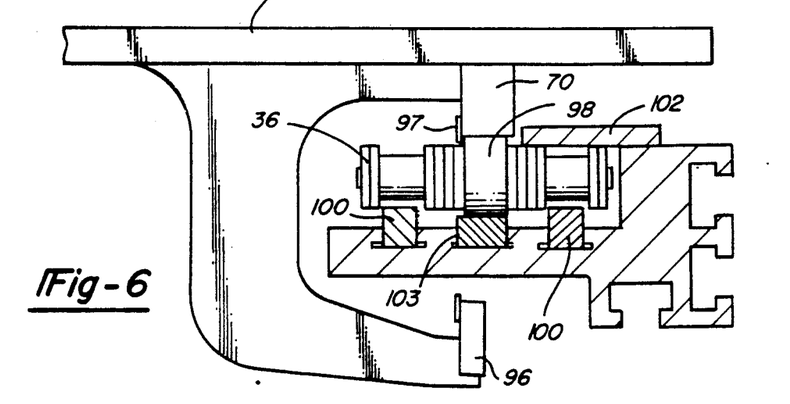
FIG. 6 is an enlarged view of a portion of the conveyor illustrated in FIG. 5.

FIG. 6 is an enlarged view of a portion of the chain conveyor illustrated in FIG. 5, but including a further feature. As shown in FIG. 6, speed bar 103 has been placed beneath second link 98. Speed bar 103 lifts chain 36 off supports 100 and increases the pallet speed for a portion of the conveyor distance. Speed bar 103 is preferably formed of a plastic that has good frictional engagement with roller 98. As the chain is pulled across speed bar 103, roller 98 rotates on it due to friction, and this rotation is transmitted to pallet 94, increasing the pallet speed. Pallet 94 is thus moved by the normal speed of the chain, and also roller 98 is rotated by the frictional engagement with speed bar 103, which in turn drives pallet 94 at a greater speed. If the frictional engagement between speed bar 103, second link 98, and upper run contact member 70 is good, the speed of the pallet 94 can be effectively doubled for a portion of the conveyor distance. Speed bar 103 may be utilized in a portion of the conveyor where it is desired to move the pallets at a rapid speed. Examples of such portions would be in an area adjacent to a parts removal station, where it is desirable to quickly remove the empty pallets from the area.

Figure 7:
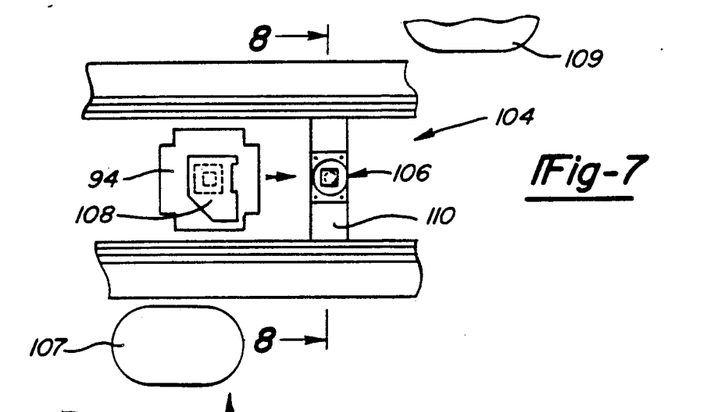
FIG. 7 shows a pallet moving along a chain conveyor according to the present invention.
Figure 8:
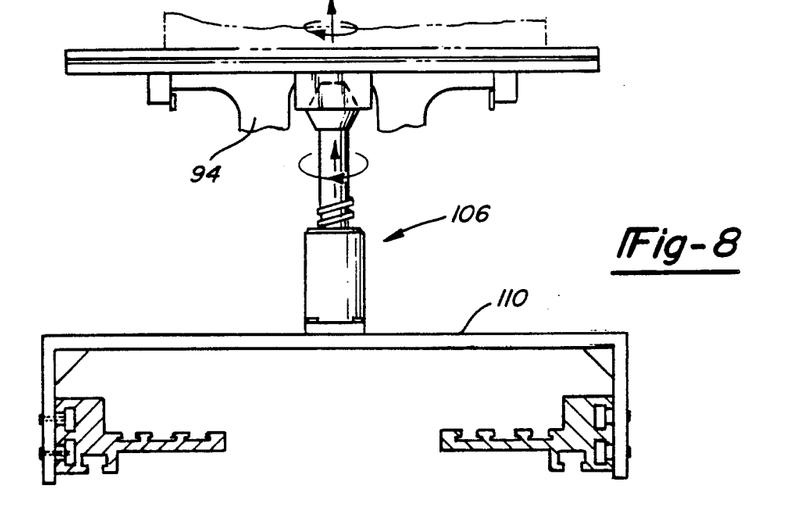
FIG. 8 is a cross-sectional view showing a robotic manipulator incorporated into the conveyor of the present invention.
Figure 9:
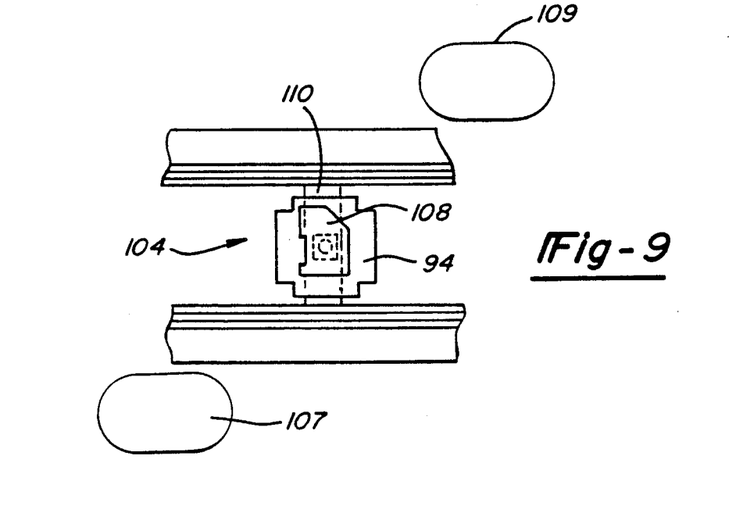
FIG. 9 is a view similar to FIG. 7, but showing the pallet having been rotated 180° by the robotic manipulator.

A further feature of the present invention is illustrated in FIGS. 7 to 9, and applies to either pallet 64 or 94. As shown in FIG. 7, pallet 94 is moving along a conveyor 104 having robotic manipulator 106 at a first position. A first machine 107 is on a upstream, right hand portion of conveyor 104, and had just completed work on part 108, which is resting on pallet 94. Pallet 94 is approaching a second machine 109, on the opposed side of conveyor 104 from first machine 107, which will perform subsequent work on part 108. It may be desired to present the same side of part 108 to each machine 107 and 109. It may not be desirable to align machines 107 and 109 on the same side of conveyor 104 since that may require an overly long conveyor.

As shown in FIG. 8, robotic manipulator 106 moves upwardly to engage, and then rotate pallet 94. Robotic manipulator 106 is shown mounted upon frame 110 of conveyor 104. The details of manipulator 106 or its mounting are not central to the invention.

FIG. 9 shows pallet 94 having been rotated by robotic manipulator 106 and returned downwardly onto conveyor 104. Part 108 faces a direction shifted 180° from that illustrated in FIG. 7, and is now properly aligned to be worked upon by second machine 109. The use of robotic manipulator 106 on conveyor line 104 allows a greater number of machine functions to be performed in a smaller conveyor distance. Relatively large machines 107 and 109 can both be utilized within a relatively short conveyor distance since they are placed on opposite sides of the conveyor. With prior art conveyors, it may not be possible to perform two machining functions on the same side of part 108, without placing machines 107 and 109 adjacent to each other along the conveyor distance.

Preferred embodiments of the present invention have been disclosed, however, a worker skilled in the art would realize that certain modifications would come within the scope of this invention, which can be understood from the following claims.

We claim:

1. A chain conveyor comprising:
   (a) a first shaft rotating about a first axis;
   (b) a second shaft rotating about a second axis being parallel to said first axis and spaced from said first axis by a conveyor distances;
   (c) frame members mounting said first and second shafts and defining axial ends of said first and second shafts;
   (d) a pair of endless chains, each being received over said first shift on said first axis, and said second shaft on said second axis, such that said endless chains extend over said first axis, extend on an upper run along said conveyor distance, extend over and under said second axis, and extend on a lower run back along said conveyor distance;
   (e) each of said endless chains having three being spaced inwardly from each of said axial ends towards the other of said axial ends, a first link being defined as the link closest to each of said axial ends, a second link being defined as the next innermost link and the third link being defined as the innermost link; and
   (f) a pallet being mounted for movement on said endless chains, said pallet having a generally planer support surface and a pair of downwardly extending guide bars, each of said guide bars having an upper run contact member in frictional contact with said second link of one of said endless chains when said pallet is on an upper run, and a lower run contact member in frictional contact with said second link of one of said endless chains when said pallet is on a lower run, said upper run contact members on each of said guide bars being spaced from each other by a distance approximately equal to the axial distance between said second links of each of said pair of endless chains, said lower run contact members being spaced by the same distance.

2. A chain conveyor as recited in claim 1, wherein a pair of upper run frames support said pair of endless chains along an upper run, said pair of upper run frames having support surfaces below each of said first and third links.

3. A chain conveyor as recited in claim 2, wherein there is a clearance between the lower run contact member and the frame for supporting the upper run chain when said pallet is on said upper run, and a clearance between said upper run contact member and a frame for said lower run chain when said pallet is on the lower run.

4. A chain conveyor as recited in claim 3, wherein a robotic manipulator is placed along said conveyor distance, said robotic manipulator lifting said pallet vertically upwardly for a portion of said clearance, rotating said pallet, and replacing said pallet upon said conveyor.

5. A chain conveyor as recited in claim 4, wherein said robot rotates said pallet approximately 180°.

6. A chain conveyor as recited in claim 2, wherein a speed bar is placed beneath the second link upon at least a first portion of the upper run, said speed bar lifting said endless chains off of said upper run supports, and frictionally engaging said second link, causing it to rotate, increasing the speed of said pallet for said first portion of said upper run where said speed bar has been disposed.

7. A chain conveyor as recited in claim 6, wherein said lower run contact member is less than the axial length of said second link, said lower run contact member riding on the innermost portion of said second link.

8. A chain conveyor as recited in claim 7, wherein sprockets which drive said endless chains are received in said second link, and are less than the axial length of said second link, said sprockets engaging the outer portion of said second link.

9. A chain conveyor as recited in claim 1, wherein at least some of the rollers in said second link are of a diameter greater than said first or third link.

10. A chain conveyor as recited in claim 1, wherein said lower run contact member is less than the axial length of said second link, said lower run contact member riding on the innermost portion of said second link.

11. A chain conveyor as recited in claim 10, wherein sprockets which drive said endless chains are received in said second link, and are less than the axial length of said second link, said sprockets engaging the outer portion of said second link.

12. A chain conveyor as recited in claim 11, wherein at least some of the rollers in said second link are of a diameter greater than said first or third link.

13. A chain conveyor as recited in claim 12, wherein a speed bar is placed beneath the second link upon at least a first portion of the upper run, said speed bar lifting said endless chains off of said upper run supports, and frictionally engaging said second link, causing it to rotate, increasing the speed of said pallet for said first portion of said upper run where said speed bar has been disposed.

* * * * *

UNITED STATES PATENT AND TRADEMARK OFFICE
CERTIFICATE OF CORRECTION

PATENT NO. : 5,070,996

DATED : December 10, 1991

INVENTOR(S) : Schwaemmle and Fein

It is certified that error appears in the above-identified patent and that said Letters Patent is hereby corrected as shown below:

In column 8, Claim 1(e), line 58, please add -- links, said three links -- after three.

Signed and Sealed this

Ninth Day of March, 1993

Attest:

STEPHEN G. KUNIN

*Attesting Officer*     *Acting Commissioner of Patents and Trademarks*